United States Patent [19]
Hope et al.

[11] 3,938,849
[45] Feb. 17, 1976

[54] METHOD AND APPARATUS FOR INHIBITING VEHICLE WHEEL LOCKING

[76] Inventors: Frederick John Charles Hope, Stanyards Farm, Chertsey Road, Chobham, Surrey; James Malcolm Pigney, Woolhampton Way, Berkshire, both of England

[22] Filed: May 29, 1974

[21] Appl. No.: 474,421

[52] U.S. Cl..................... 303/21 A; 303/10; 303/13; 303/21 F
[51] Int. Cl.²...................... B60T 8/06; B60T 13/16
[58] Field of Search.......... 303/21 F, 21 EB, 21 CF, 303/21 A, 9, 13, 10, 19, 20, 22; 188/181 A, 181 C; 235/200, 201; 137/803, 807, 808

[56] References Cited
UNITED STATES PATENTS

| | | | |
|---|---|---|---|
| 3,456,988 | 7/1969 | Gibbons et al. | 303/9 X |
| 3,495,881 | 2/1970 | Harned et al. | 303/21 F |
| 3,606,493 | 9/1971 | Schlitz et al. | 303/21 F X |
| 3,633,978 | 1/1972 | Remillieux | 303/21 F |
| 3,671,082 | 6/1972 | Stevens | 303/21 F X |

Primary Examiner—Trygve M. Blix
Assistant Examiner—Douglas C. Butler
Attorney, Agent, or Firm—Schovee & Boston

[57] ABSTRACT

An anti-skid control system for use with vehicle brakes which system comprises a control device which actuates a valve to interrupt the passage of brake pressure to a brake chamber in a cyclic manner should the wheel associated with the brake chamber tend to lock or skid. A pump generates a control signal according to the rotational speed of the wheel and the device compares this signal with a signal derived from the brake pressure. The control device operates in conjunction with a number of further valve devices to initiate the aformentioned cyclic interruption of brake pressure to the brake chamber should the control signal fall below a pre-set threshold level and this control sequence repeats itself so the brakes are successively applied and released until the wheel ceases to skid so that the control signal again rises above the threshold level.

30 Claims, 2 Drawing Figures

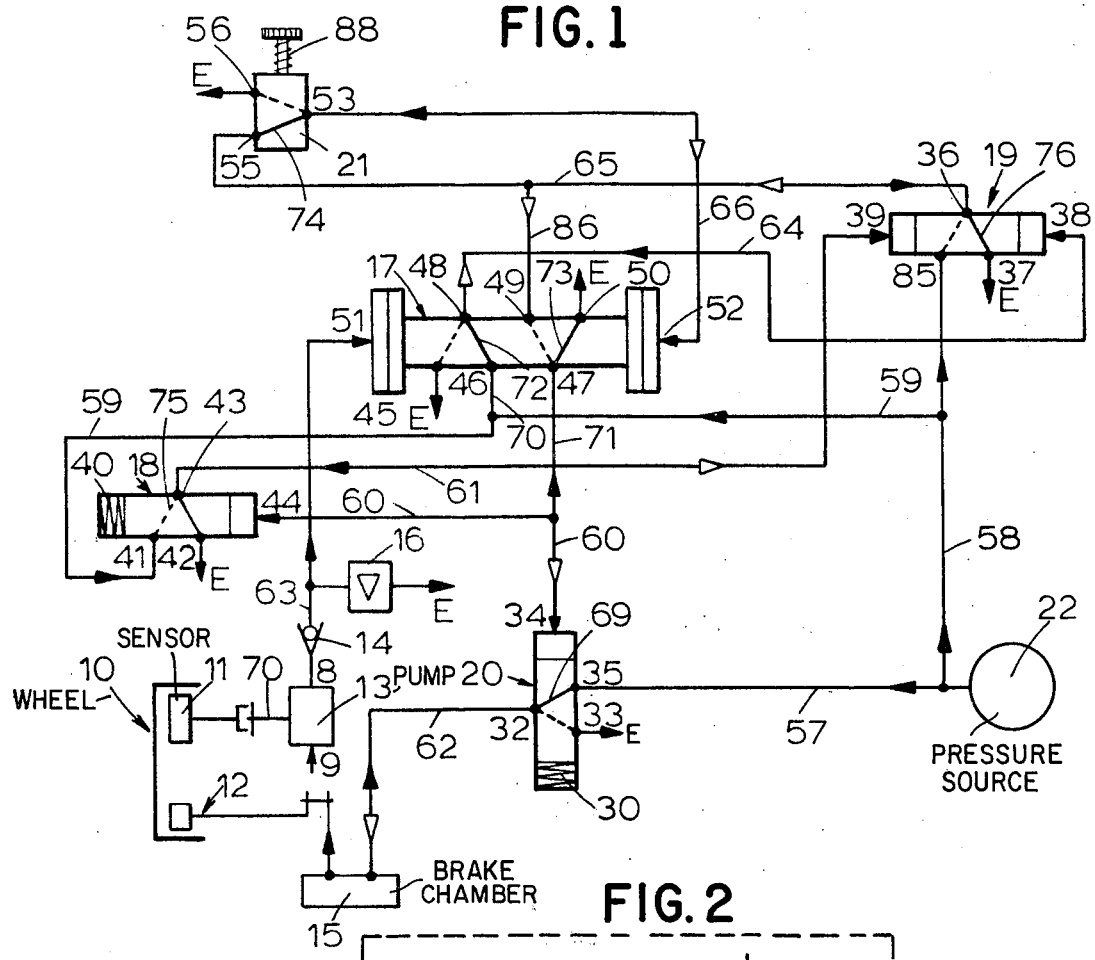
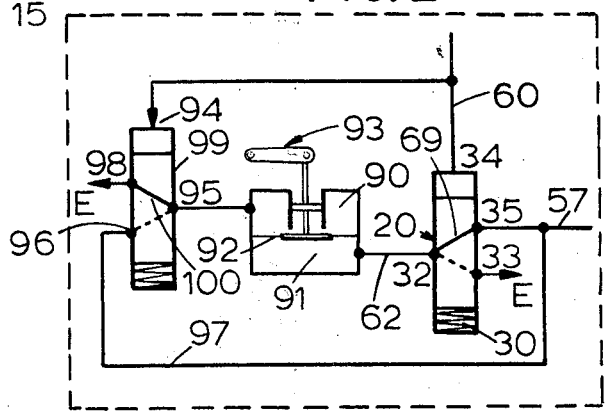

METHOD AND APPARATUS FOR INHIBITING VEHICLE WHEEL LOCKING

BACKGROUND OF THE INVENTION

The present invention relates to a system for automatically controlling a vehicle braking system to inhibit wheel locking, i.e., to a so-called anti-skid control system. The invention is particularly, but not solely, concerned with motor vehicles especially commercial vehicles with pneumatic braking systems. Various forms of anti-skid systems have been proposed which operate electrically. Generally such systems are expensive and a general object of this invention is to provide a non-electrical system which is relatively cheap and simple yet reliable and robust in operation.

SUMMARY OF THE INVENTION

According to one aspect of the invention there is provided a control system for automatic control of a vehicle braking system to inhibit wheel locking: said control system comprising means for generating a first pressure control signal from the rotation of a vehicle wheel, a valve incorporated in the brake pressure flow path and capable, when subjected to a second pressure control signal, to interrupt said flow path and means for automatically actuating said valve to periodically interrupt said flow path when the first pressure control signal indicates wheel locking said means including a control device which is fed with said first pressure control signal and with a further control signal dependent on the application of brake pressure, the control device producing said second pressure control signal to actuate the valve and interrupt said flow path when the further control signal is greater than the first control signal thereby signifying wheel locking.

Preferably the invention provides a control system for automatic control of a vehicle braking system to inhibit wheel locking: said control system comprising means for generating a pressure control signal in dependence upon the rotation of a vehicle wheel; first valve means with an input for receiving brake pressure and an output for application of said brake pressure to a brake chamber associated with said wheel, the first valve means being settable into a first state where communication between the input and output is established so that the brake pressure can be transferred through said valve means to said brake chamber or a second state where communication between the input and output is blocked and the passage for brake pressure interrupted; a control device having a first control input for receiving said control signal, a second control input for receiving pressure at least derived from the brake pressure and input and outputs, one of said outputs being connected to said valve means to cause the latter to change to the second state when pressure appears at said one output, said control device being settable into different states to establish selective communication between various groups of input and outputs in dependence upon the pressure differential between the first and second control inputs; and further valve means connected to at least some of the inputs and outputs of the control device and co-operating therewith to initiate a control sequence whereby the first valve means is changed from the first to the second state and back to the first state should said control signal signify wheel locking.

The generating means can be a high-frequency diaphragm pump and the control device can be a multi-port rapid-action diaphragm valve which can be set into one of two states with selective communication between the ports depending on the differential pressure between its control inputs.

Preferably the first valve means has a second output vented to atmosphere and this second output communicates with the first-mentioned output when the first valve means is in the second state.

The invention may be understood more readily and various other features of the invention may become more apparent from consideration of the following description:

BRIEF DESCRIPTION OF DRAWING

The present invention will be more fully understood by reference to the following detailed description thereof, when read in conjunction with the attached drawings, wherein like reference numerals refer to like elements, and wherein:

FIG. 1 is a block schematic diagrammatic representation of a control system according to the present invention, and FIG. 2 is a partial schematic partial diagrammatic representation of another embodiment of the present invention.

DESCRIPTION OF PREFERRED EMBODIMENT

In the control system described hereinafter various pneumatic valves are provided and in the drawing and following description a somewhat pictorial reference is made to the valves as having connecting elements or paths to represent the operative state of the valves. It is to be understood that such references are not intended to relate to the actual operation or construction of the valves but are used for convenience in simplifying the understanding of the control system. It should also be appreciated that although the system is described primarily in connection with pneumatic braking systems it can equally well be adapted for use with hydraulic braking systems.

The system as depicted in the drawing utilizes the rotation of a vehicle wheel to produce a pneumatic control pressure signal indicative of rotational speed. In the drawing the reference numeral 10 designates the vehicle wheel and the reference numeral 11 designates a rotation-sensing device adapted to drive a pump to generate the pressure signal. Usually each wheel would have such a device allocated to it. The device 11 may have a rotary element in frictional engagement with the brake drum of the vehicle wheel 10. This rotary element may be carried by a spindle which is coupled to an input shaft 70 of a high-frequency diaphragm pump 13. Other arrangements can be adopted to drive the pump 13 from the wheel 10. The pump 13 itself has an inlet 9 for admitting atmospheric air and an outlet 8 at which the aforesaid control pressure signal is generated. This outlet is connected via a non-return valve 14 to a conduit 63. The arrangement is such that the diaphragm of the pump 13 oscillates at an appreciable speed even when the wheel is rotating slowly as would be the case in heavy traffic. Gearing can be provided to increase the rotational speed of the input shaft 70 if desired.

As can be appreciated, in general, if the wheel 10 is stationary there will be no pressure signal on the outlet 8 of the pump 13 and hence in the conduit 63, whereas so long as the wheel rotates there is a pressure signal at the outlet 8 of the pump 13. There is also a gradual reduction in the pressure of the control signal at the pump outlet 8 as the rotational speed of the wheel 10 falls.

Turning now to the remainder of the system a notional main pressure supply or source 22, which is only active when the vehicle brakes are applied, is connected via a conduit 57 to an input port 35 of a valve device 20 and via a conduit 58 to an input port 85 of a valve device 19. A branch conduit 59 leads from the conduit 58 to an input port 41 of a valve device 18. The valve device 20 has an input/output port 32 which is connected through a conduit 62 to the brake chamber 15 associated with the wheel 10 and connected in a known manner to a brake-actuating mechanism denoted 12. The valve device 20 has a further output port 33 which is connected to atmosphere, i.e., to exhaust designated E. The valve device 20 has a connecting element or path 69 which can establish communication between the ports 32, 35 in a first position or between the ports 32, 33 in a second position. The two positions of the connecting element 69 represent the operative state of the device 20 and similar references are used hereinafter in connection with the other valve devices. The element 69 is biased by a spring 30 into the first position and the biasing action of the spring 30 can be overcome to set the element 69 to the second position when pressure is applied to a control input 34 to the valve device 20. With the element 69 in the first position the brake pressure can pass from the conduit 57 to the conduit 62 whereas with the element 69 in the second position the brake pressure is cut off and the conduit 62 is connected to atmosphere via the port 33. The outlet 8 of the pump 13 besides being connected to the conduit 63 is also connected to an adjustable bleed device 16 which vents to atmosphere and can be manually adjusted and pre-set to establish a correct range of operative pressure in the conduit 63. The conduit 63 is connected to a first control input 51 of a six port control valve device 17. A branch conduit 70 connects the conduit 59 to an input port 46 of the valve device 17 and the device 17 has a complementary output port 45 connected to atmosphere or exhaust. An input/output port 47 of the device 17 is connected via a branch conduit 71 to a conduit 60 which in turn is connected to the control input 34 of the valve device 20. The valve device 17 has an input port 49 which connects with a conduit 65 via a branch conduit 86 and an output port 50 which is connected to atmosphere. An input/output port 48 of the valve device 17 is connected to a conduit 64. The valve device 17 has two connecting elements or paths designated 72, 73. The element 72 can establish communication between the ports 48, 46 in a first position or between the ports 48, 45 in a second position. In an analogous manner the element 73 can establish communication between the ports 50, 47 in a first position or between the ports 49, 47 in a second position. The valve device 17 has a second control input 52 and incorporates a rapid-action diaphragm which is sensitive to the pressure differential between the inputs 51, 52 to set the elements 72, 73 into either their first or second positions. The control input 52 is connected via a conduit 66 to an input/output port 53 of a pre-set pressure regulating valve device 21. This device 21 has an input port 55 connected to the conduit 65 which also connects with an input/output port 36 of the valve device 19. The device 21 has an output port 56 connected to atmosphere and a connecting element or path 74 which can establish communication between the ports 53, 55 in a first position or between the ports 53, 56 in a second position. A pre-settable spring 88 serves to bias the element 74 of the device 21 into the second position and the action of the spring 88 is overcome when pressure prevails at the port 55 to cause the element 74 to adopt its first position. The spring 88 primarily serves however to adjust the pressure applied to the input 52 of the device 17 when the system is initially set up.

The conduit 60, which connects to the port 47 of the valve device 17 as well as the control input 34 of the valve device 20 is also connected to a control input 44 of the valve device 18. In addition to the input port 41 the device 18 has an output port 42 connected to atmosphere and an input/output port 43 connected via a conduit 61 to a control input 39 of the valve device 19. In a similar manner to the device 20, the device 18 has a connecting element or path 75 which can establish communication between the ports 43, 42 in a first position or between the ports 43, 41 in a second position. A spring 40 biases the element 75 into the first position and the device 18 has a control input 44 which is connected to the conduit 60, which it will be recalled connects via the conduit 71 with the port 47 of the valve device 17. Pressure at the input 44 serves to overcome the biasing action of the spring 40 to set the element 75 to the second position. The valve device 18 however is designed to have a time delay so when pressure is applied to the input 44 to change the element 75 from the first to the second position this change over takes place after a pre-set time.

Finally, the valve device 19 has, in addition to the ports 85, 36 and the control input 39, a control input 38 which is connected to the conduit 64 leading to the port 48 of the valve device 17 and an output port 37 which is connected to atmosphere. The valve device 19 has a connecting element or path 76 which can establish communication between the ports 37, 36 in a first position and between the ports 85, 36 in a second position. The presence of pressure at the input 39 causes the element 76 to adopt the first position and the presence of pressure at the input 38 causes the element 76 to adopt the second position. The control system as described functions to prevent the wheel 10 from locking when the brakes are applied to thereby inhibit skidding. To achieve this the control system continually monitors the rotational speed of the wheel 10 and if the speed decreases faster than a predetermined amount, signifying tendency to lock, the system momentarily cuts-off the braking pressure and exhausts the brake chamber 15 before allowing the pressure to be re-applied. This cut-off and re-application of the brake mechanism may occur rapidly a number of times in succession until the locking of the wheel ceases.

The operation of the system is as follows:

Assume initially that the wheel 10 is rotating so that pressure prevails in the conduit 63 due to the pump 13 and the brakes are not applied. Under these conditions the pressure at the input 51 of the valve device 17 causes the connecting elements 72, 73 to adopt the first position shown in full outline. Since the brakes are not applied no pressure prevails in the conduits 57, 58 or 59. The connecting element 69 of the valve device 20 is maintained by its spring 30 in the first position shown in full outline. Similarly the connecting element 75 of the valve device 18 is also maintained by its spring 40 in the first position shown in full outline. No pressure is applied to either input 38, 39 of the valve device 19 but the connecting element 76 of this device 19 is biased under these conditions to adopt the first position shown in full outline. No pressure is applied to the input 55 of the regulator device 21 so the connecting element 74 of this device assumes the second position shown in dotted outline. Assume now that the brakes are applied so that pressure is now present in the conduits 57, 58 and 59 and no wheel locking occurs under braking. Under these conditions the brake pressure is conveyed through the conduits 57, 62 and the valve device 20 to the brake chamber 15. The pressure in conduit 59 is applied to the input port 46 of the valve device 17 and is conveyed from the port 48 thereof to the conduit 64 and thence to the control input 38 of the valve device 19. This causes the connecting element 76 of the device 19 to adopt the second position shown in dotted outline so that the pressure applied to the input port 85 of the valve device 19 by the conduit 58 is conveyed to the port 36 and thence through the regulator device 21, the connecting element 74 of which assumes its first position, in full outline, to the control input 52 of the valve device 17. Since no locking has occurred the pressure at the input 51 exceeds that at the input 52 and this condition can be ensured by appropriate adjustment of the devices 21, 16. It follows therefore that the connecting elements 72, 73 remain in their first positions. The connecting element 75 of the valve device 18 also remains in its first position. If during braking the wheel 10 should suddenly lock so its rotational speed decreases rapidly the pressure at the input 51 of the device 17 will fall until the pressure at the input 52 of the device 17 exceeds it and the connecting elements 72, 73 will now assume their second positions shown in dotted outline. In this case the pressure prevailing in the conduit 65 will be conveyed from the input port 49 of the device 17 to the port 47 and thence via the conduit 71 to the control input 34 of the device 20.

The effect of this pressure at the input 34 of the device 20 causes the connecting element 69 thereof to adopt its second position, shown in dotted outline, to connect the brake chamber 15 to the port 33 and to atmosphere to momentarily cut off the brake pressure. The pressure in the conduit 60 is also connected to the control input 44 of the valve device 18 to cause the connecting element 75 of this device to assume its second position shown in dotted outline after a certain time delay. The effect of this is to convey the pressure in the conduit 59 through the ports 41, 43 of the device 18 and to the conduit 61 and thence to the control input of the valve 39. The pressure formerly applied to the input 38 of the device 19 is now no longer present since the ports 46, 48 of the device 17 are not connected so that the connecting element 76 of this device 19 now assumes the first position shown in full outline to thereby remove the pressure from the input 52 of the device 17. The pressure at the input 51, albeit low now prevails to trip the connecting elements 72, 73 back to their former first positions to remove the pressure in the conduits 60 and to allow the connecting elements 75, 69 of the devices 18, 20 to revert to their first positions. The brake pressure is then re-applied via the conduits 57, 62. The pressure at the input 39 of the device 19 is removed while the pressure at the input 38 is re-established to cause the connecting element 76 to change back to its second position and thereby pressure is re-applied to the input 52. The pressure at the inputs 51, 52 of the device 17 are again effectively compared and if the pressure at the input 52 is still greater the above sequence is repeated and indeed many cycles of operation, with a periodic time determined by the inertia of the mechanisms and the time delay of the valve device 18, may take place with the effect that the brake pressure is rapidly applied and exhausted to inhibit the tendency to lock whereupon the pressure at the input 51 should eventually prevail until the static condition described above re-establishes itself.

In the case where the wheel 10 is stationary and no braking pressure is established then the connecting elements 69, 75 of the valve devices 20, 18 assume their first positions while the connecting element 74 of the device 21 assumes its second position. Although no pressure is present at the inputs 51, 52 of the device 17 or at the inputs 39, 38 of the device 19 the device 17 is biased under these conditions so that the connecting elements 72, 73 assume their second position and, as mentioned previously, the device 19 is biased so that the connecting element 76 assumes its first position. In this way the supply of pressure during braking takes place normally through the valve device 20 since the input/output port 47 leading to the control input 34 of the valve device 20 is connected to the output 37 of the valve device 19. Only when the wheel rotates does the system become enabled for control and the above-mentioned operative conditions establish themselves.

In order to improve the speed of response of the system to wheel locking the brake chamber 15 can incorporate a diaphragm and two working chambers one of which is pressurized to cause the application of the brake and the other of which is pressurized to cause the positive release of the brake. A further valve device, similar to the device 20 but operating in a contrary sense thereto would feed the release working chamber so that the application of pressure to the input 34 of the device 20 which causes the exhaust of the main working chamber occurs simultaneously with the application of pressure to the corresponding control input of this other valve device to cause the latter to open communication between the conduit 57 and the release working chamber. This modification is represented in the scrap view at the bottom of the drawing where the reference number 90 denotes the release chamber, 91 the main working chamber, 92, the diaphragm, and 93 the associated brake mechanism. The additional valve device is designated 99 and has a control input 94 leading to the conduit 60, an input/output port 95 connected to the release chamber 90, an input port 96 connected via a conduit 97 to the conduit 57 and an output port 98 connected to atmosphere. The valve device 99, similarly to the device 20, has a connecting element 100 which is biased by a spring 101 into a first position, shown in full line, to connect the ports 95, 98. The element 100 can be switched into a second position, shown in dotted outline, by the application of pressure to the control input 94.

The operation of the modified system can be readily appreciated from the description above.

We claim:

1. A control system for automatic control of a vehicle braking system to inhibit wheel locking: said control system comprising means for generating a first fluid pressure in dependence upon the rotation of a vehicle wheel; first valve means with an input for receiving brake pressure and an output for application of said brake pressure to a brake chamber associated with said wheel, the first valve means being settable into a first state where communication between the input and output is established so that the brake pressure can be transferred through said valve means to said brake chamber or a second state where communication between the input and output is blocked and the passage for brake pressure interrupted; a multi-port fluid valve control device having two positions and having a first control input for receiving said first fluid pressure, and a second control input for receiving a second fluid pressure, said second fluid pressure being the brake pressure, and the control device having a plurality of inputs and outputs, one of said outputs being connected to said first valve means to cause the latter to change to the second state when pressure appears at said one output, said control device being movable between said two positions to establish selective communication between various groups of said inputs and outputs in dependence upon the pressure differential between said first and second control inputs; and said control device being in its second state when pressure appears at said one output, and being at its first state when pressure does not appear at said one outlet and said control device being movable from said first state to said second state when the pressure at said second control input is greater than the pressure at said first control input.

2. A system according to claim 1, wherein said generating means is in the form of a high frequency diaphragm pump.

3. A system according to claim 2, wherein the pump is connected to an adjustable bleed device which can vary to the pressure presented to the first control input of the control device.

4. A system according to claim 1, wherein the first valve means is biased by a spring into the first state and the force of the spring is overcome by pressure at said one output of the control device.

5. A system according to claim 4, wherein the first valve means has a second output vented to atmosphere and this second output communicates with said one of said outputs when the first valve means is in the second state.

6. A system according to claim 1, wherein the control device is a six port diaphragm valve device the ports of which form a first input, a second input, a first output, a second output, a first input/output port and a second input/output port, the first input/output being connected to the first valve means and constituting said one output, and the first and second outputs being vented to atmosphere, means for establishing communication between the second input/output and either the first output or the first input, means for establishing communication between the first input/output and either the second output or the second input; said means being operable in unison by the differential pressure between the first and second control inputs to set the device in either a first or second state.

7. A system according to claim 6 wherein the first and second inputs serve to receive brake pressure and in the first state the second input/output communicates with the first input while the first input/output communicates with the second output and in the second state the second input/output communicates with the first output while the first input/output communicates with the second input.

8. A system according to claim 7, wherein the first input receives brake pressure directly while the second input receives brake pressure via at least part of said further valve means.

9. A system according to claim 7, wherein said further valve means comprises first and second valve devices, the first valve device having an input for receiving brake pressure, an output vented to atmosphere, an input/output connected to the second control input of the control device and first and second control inputs whereby the application of pressure to said first control input sets the valve device to a first state where communication is only established between the input/output and the output and the application of pressure to said second control input sets the valve device to a second state where communication is only established between the input/output and the input, the second control input being connected to the second input/output of the control device.

10. A system according to claim 9, wherein the second valve device has an input serving to receive the brake pressure, an output vented to atmosphere and an input/output connected to the first control input of the first valve device, the valve device being settable in a first state where communication is only established between the output and the input/output or a second state where communication is only established between the input and the input/output, the second valve device having a spring for biasing the device into the first state and a control input connected to the first input/output of the control device so that when pressure appears at the first input/output of the control device the second valve device changes to the second state after a pre-set time delay.

11. A system according to claim 9, wherein an adjustable pressure regulating device is interposed between the input/output of the first valve device and the second control input of the control device.

12. A system according to claim 1, wherein the first valve means is connected to a brake application chamber which is separated by a diaphragm from a brake release chamber, the brake release chamber being connected to another valve means which is arranged to apply pressure to the release chamber when the first valve means is in the second state and to exhaust the release chamber when the first valve means is in the first state.

13. In a control system for automatic control of a vehicle braking system to inhibit wheel locking including a fluid pressure actuated brake for braking a vehicle wheel and a conduit through which braking fluid pressure is applied from a source to the brake, the improvement wherein: said control system comprises means for generating a first fluid pressure from the rotation of a vehicle wheel, a valve incorporated in said conduit and capable, when subjected to a second fluid pressure, to interrupt fluid flow therein and means for automatically actuating said valve by subjecting it to said second fluid pressure to periodically interrupt said flow when the first fluid pressure indicates wheel locking, said means including a multi-port fluid valve control device which is fed with said first fluid pressure and with a further fluid pressure dependent on the applied brake pressure, the control device producing said second fluid pressure to actuate said valve and interrupt said flow when said further fluid pressure is greater than the first fluid pressure thereby signifying wheel locking.

14. In a control system for automatic control of a vehicle braking system to inhibit wheel locking and including a fluid pressure actuated brake for braking a vehicle wheel, a conduit through which braking fluid pressure is applied from a source to the brake, and a valve in said conduit for controllably interrupting and releasing the application of pressure to the brake, the improvement comprising:
  a. means responsive to rotation of a vehicle wheel for generating a first fluid pressure in proportion to the rotational speed of the wheel,
  b. means for comparing said first fluid pressure with a second fluid pressure, said second fluid pressure being the applied pressure in said brake fluid conduit upstream of said valve, and
  c. means for causing said valve to start to oscillate back and forth between a first state and a second state, when said second fluid pressure is a predetermined value greater than said first fluid pressure, said first state being wherein said valve is open between said source and said brake and provides fluid communication through said conduit to said brake, and said second state being wherein said valve is closed between said source and said brake and blocks fluid communication through said valve between said source and said brake and said second state also being wherein said valve is open between said brake and a pressure release port and releases the fluid pressure in said brake.

15. The apparatus according to claim 14 wherein said brake is a pneumatic brake and wherein said valve includes means for exhausting air in said conduit downstream from said valve to atmosphere when said valve is in said second condition.

16. The apparatus according to claim 14 wherein said valve includes a spring for urging said valve to said first condition and said means for causing said valve to oscillate between its first and second conditions comprises a fluid pressure input port whereby fluid pressure can move said valve from said first to said second condition and said spring moves said valve from said second to said first condition after said fluid pressure has been removed.

17. The apparatus according to claim 14 wherein said comparing means is also said means for causing said valve to oscillate and comprises means for alternately applying pressure to and removing pressure from said valve means in response to the existence of at least a predetermined difference between said first pressure and said second pressure.

18. The apparatus according to claim 17 wherein said comparing means comprises a longitudinally movable spool valve having two positions and having a plurality of inlet and outlet ports and a pair of control inputs and wherein said means for generating a first fluid pressure comprises means for applying said first fluid pressure to a first one of said control inputs and wherein said means for comparing said first fluid pressure with said second fluid pressure comprises means for applying said second fluid pressure to a second one of said control inputs.

19. The apparatus according to claim 18 wherein said valve includes a spring for urging said valve to said first condition and said means for causing said valve to oscillate between its first and second conditions comprises a fluid pressure input port whereby fluid pressure can move said valve from said first to said second condition and said spring moves said valve from second to said first condition after said fluid pressure has been removed.

20. The apparatus according to claim 19 wherein said brake is a pneumatic brake and wherein said valve includes means for exhausting air in said conduit downstream from said valve to atmosphere when said valve is in said second condition.

21. The apparatus according to claim 20 wherein said generating means comprises a high frequency diaphragm pump including a drive means responsive to the wheel rotation.

22. The apparatus according to claim 14 wherein said comparing means comprises a longitudinally movable spool valve having two positions and having a plurality of inlet and outlet ports and a pair of control inputs and wherein said means for generating a first fluid pressure comprises means for applying said first fluid pressure to a first one of said control inputs and wherein said means for comparing said first fluid pressure with said second fluid pressure comprises means for applying said second fluid pressure to a second one of said control inputs.

23. The apparatus according to claim 14 wherein said generating means comprises a high frequency diaphragm pump including a drive means responsive to the wheel rotation.

24. The apparatus according to claim 14 wherein said comparing means comprises a multi-port rapid action diaphragm valve having two control inputs and being movable between a first position and a second position in response to the pressure differential between said two control inputs, and wherein said first fluid pressure is connected to said first one of said control inputs and said second fluid pressure is connected to said second control input.

25. The apparatus according to claim 24 wherein said diaphragm valve is a six port device, the ports of which form a first input, a second input, a first output, a second output, a first input/output port and a second input/output port, the first input/output port being connected to the first valve means for causing said first valve means to move from said first to said second condition, said first and second outputs being vented to atmosphere, and said diaphragm valve including means for establishing communication between the second input/output and either the first output or the first input and means for establishing communication between the first input/output and either the second output or the second input.

26. The apparatus according to claim 25 wherein the first and second inputs serve to receive brake pressure, and when said diaphragm valve is in said first position the second input/output communicates with the first input while the first input/output communicates with the second output and when said diaphragm valve is in said second position the second input/output communicates with the first output while the first input/output communicates with the second input.

27. The apparatus according to claim 26 wherein said first input receives brake pressure directly while the second input receives brake pressure indirectly via additional valve means connected to at least some of said inputs and outputs.

28. The apparatus according to claim 26 wherein said additional valve means comprises first and second valve devices, the first valve device having an input for receiving brake pressure, an output vented to atmosphere, an input/output connected to the second control input of the diaphragm valve and first and second control inputs whereby the application of pressure to said first control input of said first valve device sets the valve device to a first state where communication is only established between the input/output and the output and the application of pressure to said second control input of said first valve device sets the valve device to a second state where communication is only established between the input/output and the input, the second control input of the first valve device being connected to the second input/output of the diaphragm valve.

29. The apparatus according to claim 28, wherein the second valve device has an input serving to receive the brake pressure, an output vented to atmosphere, and an input/output connected to the first control input of the first valve device, the second valve device being settable in a first state where communication is only established between the output and the input/output or a second state where communication is only established between the input and the input/output, the second valve device having a spring for biasing the second valve device into the first state and a control input connected to the first input/output of the diaphragm valve so that when pressure appears at the first input/output of the diaphragm valve the second valve device changes to the second state after a pre-set time delay.

30. The apparatus according to claim 29 wherein an adjustable pressure regulating device is interposed between the input/output of the first valve device and the second control input of the diaphragm valve.

* * * * *